United States Patent
Zhang et al.

(10) Patent No.: US 11,933,724 B1
(45) Date of Patent: Mar. 19, 2024

(54) DEVICE OF COMPLEX GAS MIXTURE DETECTION BASED ON OPTICAL-PATH-ADJUSTABLE SPECTRUM DETECTION AND METHOD THEREFOR

(71) Applicants: Hubei University of Technology, Wuhan (CN); CSG Electric Power Research Institute Co., Ltd., Guangzhou (CN)

(72) Inventors: Yin Zhang, Wuhan (CN); Xiaoxing Zhang, Wuhan (CN); Ran Zhuo, Wuhan (CN); Zhiming Huang, Wuhan (CN); Guozhi Zhang, Wuhan (CN); Dibo Wang, Wuhan (CN); Shuangshuang Tian, Wuhan (CN); Mingli Fu, Wuhan (CN); Yunjian Wu, Wuhan (CN); Yan Luo, Wuhan (CN); Shuo Jin, Wuhan (CN); Jinyu Pu, Wuhan (CN); Yalong Li, Wuhan (CN)

(73) Assignee: Hubei University of Technology, Wuhan (CN)

( * ) Notice: Subject to any disclaimer, the term of this patent is extended or adjusted under 35 U.S.C. 154(b) by 0 days.

(21) Appl. No.: 18/527,214

(22) Filed: Dec. 1, 2023

(30) Foreign Application Priority Data

Feb. 3, 2023 (CN) .......................... 202310054615.1

(51) Int. Cl.
*G01N 21/3504* (2014.01)
*G01N 21/25* (2006.01)

(52) U.S. Cl.
CPC ....... *G01N 21/3504* (2013.01); *G01N 21/255* (2013.01); *G01N 2201/0636* (2013.01); *G01N 2201/101* (2013.01); *G01N 2201/126* (2013.01)

(58) Field of Classification Search
CPC ............ G01N 21/3504; G01N 21/255; G01N 2201/0636; G01N 2201/101; G01N 2201/126
See application file for complete search history.

(56) References Cited

U.S. PATENT DOCUMENTS 9,052,232 B2 * 6/2015 Smith ................... G01J 3/0291

FOREIGN PATENT DOCUMENTS

| CN | 102590092 A | 7/2012 |
|---|---|---|
| CN | 114199795 A | 3/2022 |

* cited by examiner

*Primary Examiner* — Jamil Ahmed
(74) *Attorney, Agent, or Firm* — Nitin Kaushik

(57) ABSTRACT

Disclosed are a device of complex gas mixture detection based on optical-path-adjustable spectrum detection and a method therefor, and the device includes: a light source configured for generating an incident beam and emitting the incident beam into an optical gas cell; the optical gas cell, including a cavity configured for accommodating a gas sample, and a reflection module group configured for reflecting the incident beam and a track arranged in the cavity, where the track is consistent with a light path of the light beam in the cavity; a detector module that is connected with the track in a relatively movable manner and is configured for receiving light beams and obtaining spectral data, where an optical path is changed by moving the detector module relative to the track; and a data acquisition unit that is configured for acquiring the spectral data obtained by the detector module.

10 Claims, 9 Drawing Sheets

DEVICE OF COMPLEX GAS MIXTURE DETECTION BASED ON OPTICAL-PATH-ADJUSTABLE SPECTRUM DETECTION AND METHOD THEREFOR

CROSS-REFERENCE TO RELATED APPLICATIONS

The application claims priority to Chinese patent application No. 2023100546151, filed on Feb. 3, 2023, the entire contents of which are incorporated herein by reference.

TECHNICAL FIELD

The present disclosure belongs to the technical field of spectral detection of gas mixtures, and particularly relates to a device of complex gas mixture detection based on optical-path-adjustable spectrum detection and a method therefor.

BACKGROUND

As an excellent insulating medium, SF6 gas has been widely used in the power sector, but always poses a threat to the global atmospheric environment due to its extremely prominent greenhouse effect. A gas mixture of C4F7N/CO2 is an environmentally friendly insulating gas with great application potential. Related electrical equipment with the gas mixture of C4F7N/CO2 as an insulating medium has been gradually put into field applications. In order to ensure reliability of gas mixture of insulated electrical equipment with the gas mixture of C4F7N/CO2 as an insulating medium in terms of applications, it is necessary to adopt fast and portable detection methods to analyze components of a gas inside the equipment, so as to facilitate on-site status assessment and fault diagnosis of the electrical equipment with the gas mixture of C4F7N/CO2 as an insulating medium and promote the development and improvement of techniques for operation & maintenance and overhaul of gas-insulated electrical equipment.

Infrared spectroscopy has the advantages of fast response, high sensitivity, and convenient operation. Compared with methods of chemical detection based on semiconductor sensors and the like, infrared spectroscopy has less cross-interference and will not damage gas samples, and is deemed as an ideal gas detection method. At present, some devices for detection of gases dissolved in oil based on infrared spectroscopy (including photoacoustic spectroscopy and Fourier-transform infrared spectroscopy) have been applied in the field somewhat and have been recognized to a certain extent. For infrared spectroscopy, a band with less cross-interference effect between gas components is usually selected as a detection band, and a laser light source or a broadband light source combined with a narrow-band filter is used as a detection light source to solve the cross-interference problem of gas components. However, a gas insulating medium (such as SF6, C4F7N, CO2, etc.) will produce certain spectral absorption effect, and its concentration inside the equipment is relatively high, so that superimposed interference exists between most spectral bands and decomposition components. Especially for the gas mixture of C4F7N/CO2 as an insulating medium, it is difficult to avoid such interference effect by selecting a suitable narrow-linewidth light source.

In common application scenarios, concentrations of gas components are generally in the same order of magnitude. It is a commonly used method to solve the problem of superposition of multi-component spectral interference and realize qualitative and quantitative detection of each gas component by analyzing an infrared spectrum of a multi-component gas mixture through a spectral decoupling method. However, for gas-insulated electrical equipment, there is a large gap between a concentration of a background gas (that is, a gas-insulating medium) and a concentration of a decomposition component, resulting in that it is difficult to determine an optical path length of an optical gas cell when developing a detection plan, that is, a too long optical path length of the optical gas cell and a saturated spectrum of the background gas completely cover up spectral information of decomposed trace components, thus making the spectral analysis become impossible; and when the optical path of the optical gas cell is too short, sensitivity of detection pf the decomposed trace components is limited, resulting in that it is difficult to achieve accurate detection in a qualitative and quantitative manner. Furthermore, a conventional infrared spectrometer has no portability in terms of obtaining infrared spectra, and to construct an online monitoring system, a stable and reliable working environment and a special gas circuit design are required, which will increase the complexity of an overall structure of electrical equipment, and may lead to a decline in equipment security. A miniaturized infrared spectrum detection method constructed based on traditional spectroscopic techniques (dispersing type and Fourier-transform type, etc.) usually achieves detection of equipment by scaling down, which leads to a serious decline in performance of the equipment, and usually a high cost.

SUMMARY

An objective of the present disclosure is to provide a device of complex gas mixture detection based on optical-path-adjustable spectrum detection and a method therefor, so as to solve the problems pointed out in the background art.

In an aspect, the present disclosure can be used to explore an intrinsic relationship between an optical path length of an optical gas cell and an infrared spectrum of a multi-component gas mixture, and to provide data support for obtaining an optimal optical path length of the optical gas cell; and in a further aspect, the present disclosure can realize portable detection, and further improve detection accuracy.

Work of preparation for the present disclosure is as follows:

An infrared spectrogram of a gas mixture of C4F7N/CO2 with a volume fraction of 4% is obtained by use of Fourier-transform infrared spectroscopy (FTIR) and an optical gas cell with a 4 m long optical path, as shown in FIG. 1. Further, by collecting the existing literature to summarize types of decomposition components of C4F7N, infrared spectrum data of most decomposition components of C4F7N are obtained, as shown in FIG. 2. As seen from FIG. 2, infrared spectra of the decomposition components of C4F7N are basically in a wave number range of 500-3000 cm-1, causing serious cross-interference with the infrared spectra of the gas mixture of C4F7N/CO2. An experiment of superheated decomposition of the gas mixture of C4F7N/CO2 is carried out to obtain a gas mixture of C4F7N/CO2 containing decomposition components under real conditions; and an infrared spectrum of the gas mixture of C4F7N/CO2 before superheating is calculated and deducted by subtracting a difference spectrum to obtain the difference spectrum containing only information of the decomposition components, as shown in FIG. 3. As seen from FIG. 3, infrared spectra can be used to detect three decomposition components, i.e., CO, C3F6 and COF2.

It can be seen from the above research results that the types of decomposition components that can be detected by use of infrared spectroscopy are limited, and infrared spectroscopy is not enough to support future field applications, mainly because although an optical gas cell with a long optical path can improve the sensitivity of detecting decomposed trace components, an infrared spectral range of the C4F7N gas is extended.

FIG. 4 is an infrared spectrogram of the gas mixture of C4F7N/CO2 with a volume fraction of 4% obtained by use of an optical gas cell with a short optical path of 0.1 m. In combination with FIG. 1 and FIG. 4, it can be found that the optical path length has a great influence on the infrared spectrum of the gas mixture of C4F7N/CO2. Specifically, the longer the optical path is, the larger a spectrum saturation range of C4F7N is. In combination with FIG. 2, an optical path length of 4 m fully meets requirements for detection of the decomposition components, and even an infrared spectrum of some decomposition components is saturated in a certain band range. Therefore, it is suggested to appropriately shorten the optical path length to reduce a spectral saturation effect of the C4F7N gas, so as to dig out more decomposition component information for detection. The effects of the optical path length on the spectra of C4F7N, CO2 and various decomposition components are different, and it is difficult to take into account all gas components when the optical path length is fixed. Therefore, it is necessary to realize optical path adjustability of the detection device.

In an aspect, the embodiments of the present disclosure provide a device of complex gas mixture detection based on optical-path-adjustable spectrum detection, and the device includes:

a light source that is configured for generating an incident beam and emitting the incident beam into an optical gas cell;

the optical gas cell, including a cavity, and a reflection module group and a track arranged in the cavity, where the cavity is configured for accommodating a gas sample, the reflection module group is configured for reflecting the incident beam, and the track is consistent with a light path of the light beam in the cavity;

a detector module that is connected with the track in a relatively movable manner and is configured for receiving light beams and obtaining spectral data, where an optical path is changed by moving the detector module relative to the track; and a data acquisition unit that is configured for acquiring the spectral data obtained by the detector module.

In the embodiments of the present disclosure, optical path adjustability is achieved by changing the optical path by moving the detector module relative to the track. Spectral data corresponding to different optical paths can be obtained by changing a position of the detector module. In an aspect, the spectral data obtained under different optical paths can be used to explore the intrinsic relationship between an optical path length of an optical gas cell and a spectrum of a complex gas mixture and provide data support for obtaining an optimal optical path length of the optical gas cell; and in a further aspect, by analyzing the spectral data, qualitative and/or quantitative detection of gas samples can also be achieved.

In some specific embodiments, the above device of complex gas mixture detection further includes a first driving motor and a transmission mechanism on the track, where the detector module is connected to the transmission mechanism, an output shaft of the first driving motor is connected to the transmission mechanism, and the transmission mechanism is configured to convert rotary motion outputted by the first driving motor into linear motion of the detector module, so as to drive the detector module to move along the track; and a ball screw can be chosen as the transmission mechanism.

Further, the above device of complex gas mixture detection further includes a second driving motor and a third driving motor; the detector module is connected to the transmission mechanism by means of a support frame, a vertical shaft is arranged on the support frame, and the detector module is slidably connected to the vertical shaft; the second driving motor is arranged on the support frame and configured to drive the detector module to move up and down along the vertical shaft; and the third driving motor is also arranged on the support frame and configured to drive the detector module to rotate.

In some specific embodiments, the detector module employs a μFPF detector array.

In a further aspect, the embodiments of the present disclosure provide a method of complex gas mixture detection based on optical-path-adjustable spectrum detection, and the method includes the following steps:

S100: preparing a variety of standard gas samples with different components and concentrations, and using the above device of complex gas mixture detection to collect the spectral data of each of the standard gas samples under continuously changing optical paths so as to obtain a sample data set;

S200: analyzing the sample data set to obtain a three-dimensional spectrogram of absorbance, a wave number and an optical path length of each of the standard gas samples, so as to construct a three-dimensional spectrum library of the sample data set;

S300: using the three-dimensional spectrum library to train a deep learning model so as to obtain a gas mixture detection model; and S400: using the above device of complex gas mixture detection to collect the spectral data of a gas sample to be detected under continuously changing optical paths, and constructing a three-dimensional spectrogram of the gas sample to be detected; and inputting the three-dimensional spectrogram into the gas mixture detection model, i.e., performing qualitative and/or quantitative detection of the gas sample to be detected.

In some specific embodiments, a convolutional neural network model may be adopted as the deep learning model.

In some specific embodiments, the above device of complex gas mixture detection is used to collect the spectral data of each of the standard gas samples under continuously changing optical paths, specifically including:

the optical gas cell contains the standard gas samples, so that the detector module moves relative to the track according to a preset optical path step size; in a process of moving each time, spectral data is collected, thereby obtaining the spectral data of the standard gas samples under continuously changing optical path lengths.

In some specific embodiments, the above device of complex gas mixture detection is used to collect the spectral data of the gas sample to be detected under continuously changing optical paths, specifically including:

the optical gas cell contains the gas sample to be detected, so that the detector module moves relative to the track according to a preset optical path step size; in a process of moving each time, spectral data is collected, thereby obtaining the spectral data of the gas sample to be detected under continuously changing optical path lengths.

In some specific embodiments, the standard gas samples include a plurality of prepared standard gas samples and/or simulated fault gas samples with different components and concentrations; the simulated fault gas samples are gas mixtures generated by simulating different faults of electrical equipment. A standard detection instrument is used for qualitative and quantitative detection of a simulated fault gas sample to obtain the components of the simulated fault gas sample and the concentrations of each component thereof.

Compared with the prior art, the present disclosure has the following advantages and beneficial effects:
(1) The present disclosure realizes the optical path adjustability and enables to obtain spectral data under different optical paths; the obtained data can be used to explore an intrinsic relationship between an optical path length of an optical gas cell and a spectrum of a complex gas mixture, to clarify the variation of a spectrum of each gas component under different optical path lengths, and to provide data support for obtaining an optimal optical path length of the optical gas cell.
(2) The present disclosure can further improve the accuracy of complex gas mixture detection.
(3) The device of complex gas mixture detection of the present disclosure is capable to realize portable detection.

Figure 1:
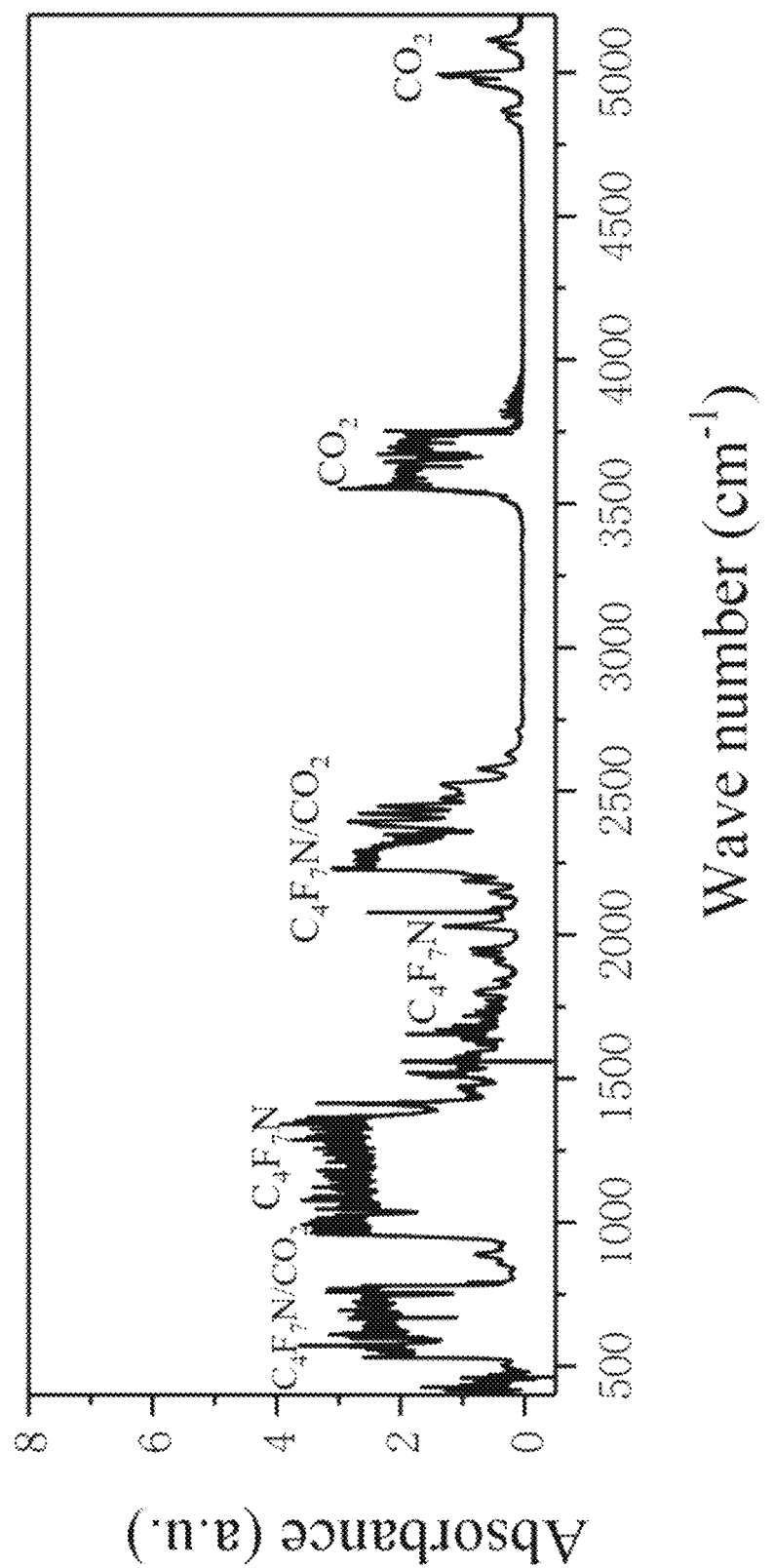
FIG. 1 is an infrared spectrogram of a gas mixture of C4F7N/CO2 measured in an optical gas cell with an optical path of 4 m.
Figure 2:
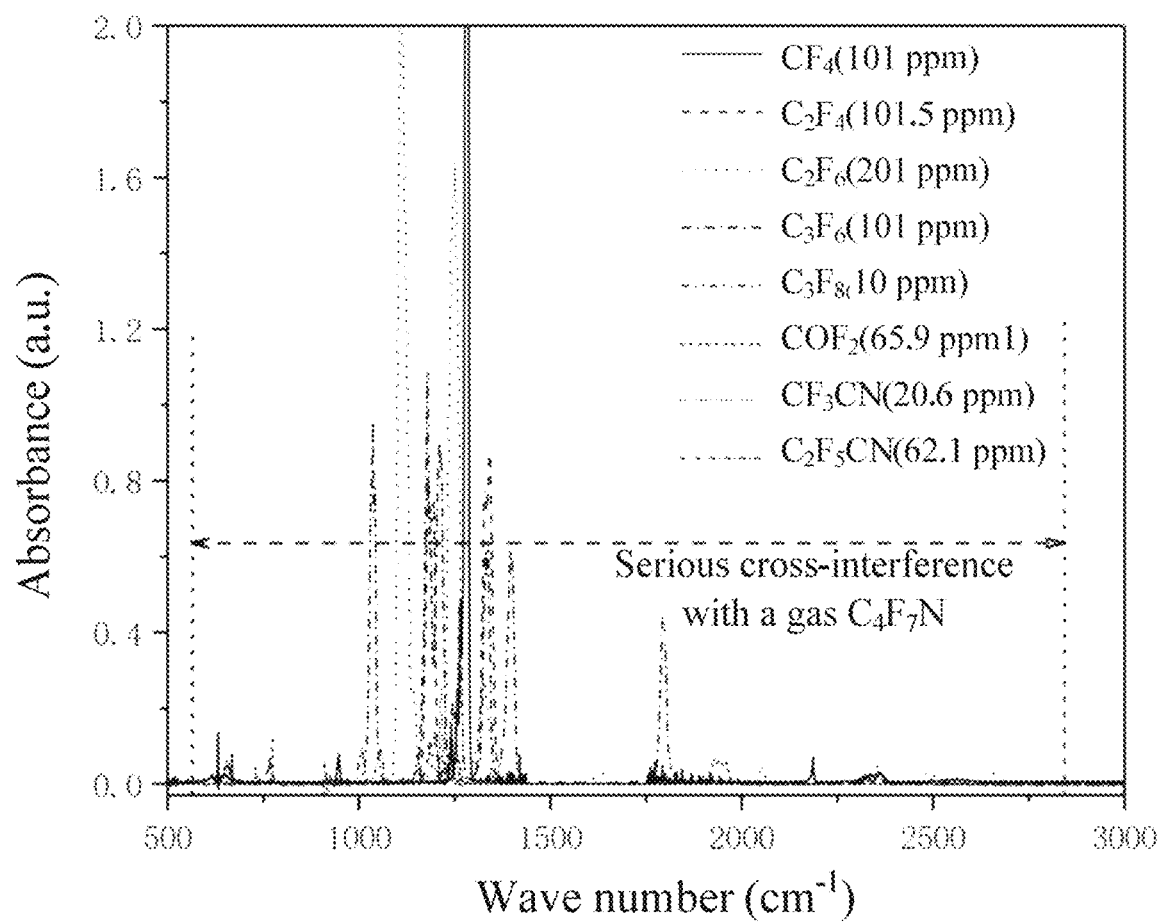
FIG. 2 shows infrared spectrum data of decomposition components of C4F7N measured in an optical gas cell with an optical path of 4 m.
Figure 3:
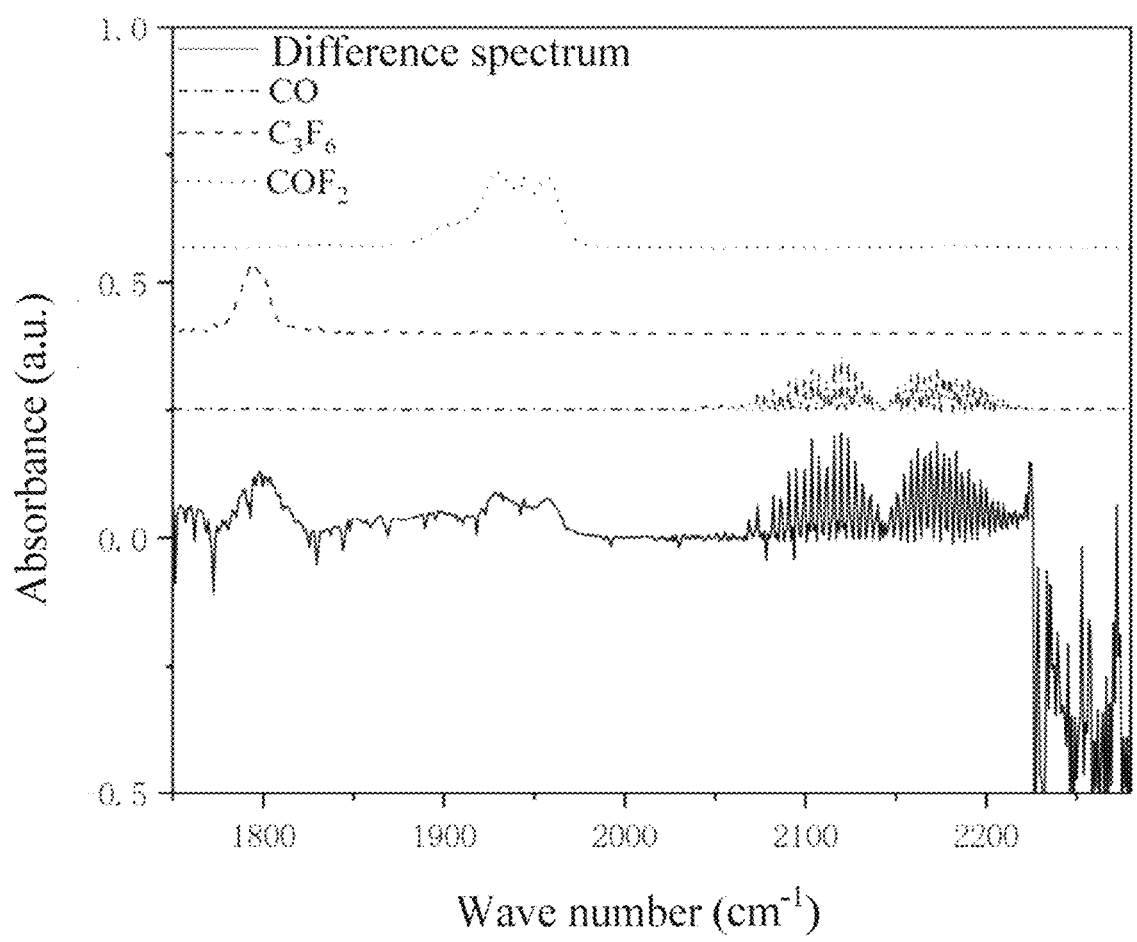
FIG. 3 shows a difference spectrum of the gas mixture of C4F7N/CO2 before and after decomposition by superheating and a standard infrared spectrum of the decomposition components.
Figure 4:
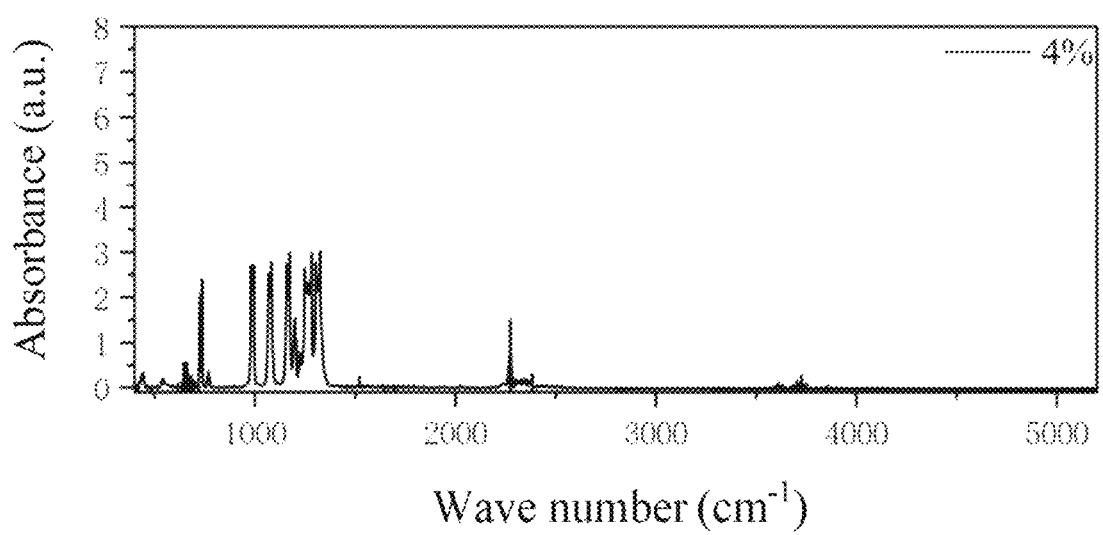
FIG. 4 is an infrared spectrogram of the gas mixture of C4F7N/CO2 measured in an optical gas cell with a short optical path of 0.1 m.

In the figures: 100-light source; 200-optical gas cell, 210-cavity, 211-inlet, 212-outlet. 213-incident lens, 220-track, 221-transmission mechanism, 222-first driving motor, 231-first reflector, 232-second reflector. 233-third reflector, 300-detector module, 310-support frame. 311-vertical shaft, 320-second driving motor, 330-third driving motor; 400-data acquisition unit; 500-gas sampling bag; 600-standard detection instrument; 700-valve, 800-sampling pump, 900-optical path.

DETAILED DESCRIPTION OF THE EMBODIMENTS

In order to make the objectives, technical solutions and advantages of the present disclosure clearer, the present disclosure will be described in further detail below in conjunction with the embodiments. It should be understood that the particular embodiments described herein are merely illustrative of the present disclosure and are not intended to limit the present disclosure.

At present, before performing gas absorption spectrum detection of a gas sample, an optical path length of an optical gas cell is usually fixed first, and then spectral analysis software is used to process a two-dimensional infrared spectrogram composed of absorbance and wave number information so as to achieve qualitative and/or quantitative detection of the gas sample. In a multi-component gas mixture, each gas component has a different absorption coefficient, and the effects of the optical path length on the spectra of different gas components are different, so that it is difficult to take into account all gas components when the optical path length is fixed. Therefore, the present disclosure provides a device of complex gas mixture detection based on optical-path-adjustable spectrum detection.

The embodiments of the present disclosure will be described in detail below with reference to FIGS. 5-8.

The device of complex gas mixture detection in the embodiments of the present disclosure includes a light source 100, an optical gas cell 200, a detector module 300, and a data acquisition unit 400, where the light source 100 is configured for generating an incident beam and emitting the incident beam into an optical gas cell 200, the optical gas cell 200 is configured to accommodate a gas sample and reflect the incident beam, the detector module 300 is configured for receiving light beams and obtaining spectral data, and the data acquisition unit 400 is configured for acquiring the spectral data obtained by the detector module 300. In one possible implementation, when the light source 100 is an infrared light source, and accordingly, when the detector module 300 is an infrared detector module, the obtained spectrum data is infrared spectrum data.

In the embodiments of the present disclosure, the optical gas cell 200 includes a sealed cavity 210, and a reflection module group and a track 220 arranged in the cavity 210, where the cavity 210 is configured for accommodating a gas sample, the reflection module group includes one or more reflection modules and is configured for reflecting the incident beam inside the cavity 210 once or multiple times, and the track 220 is consistent with a light path 900 of the light beam in the cavity 210. The optical gas cell 200 is preferably a White-type cell, which is capable to reflect the light beam multiple times, thereby extending the optical path length within a limited size range.

Figure 6:
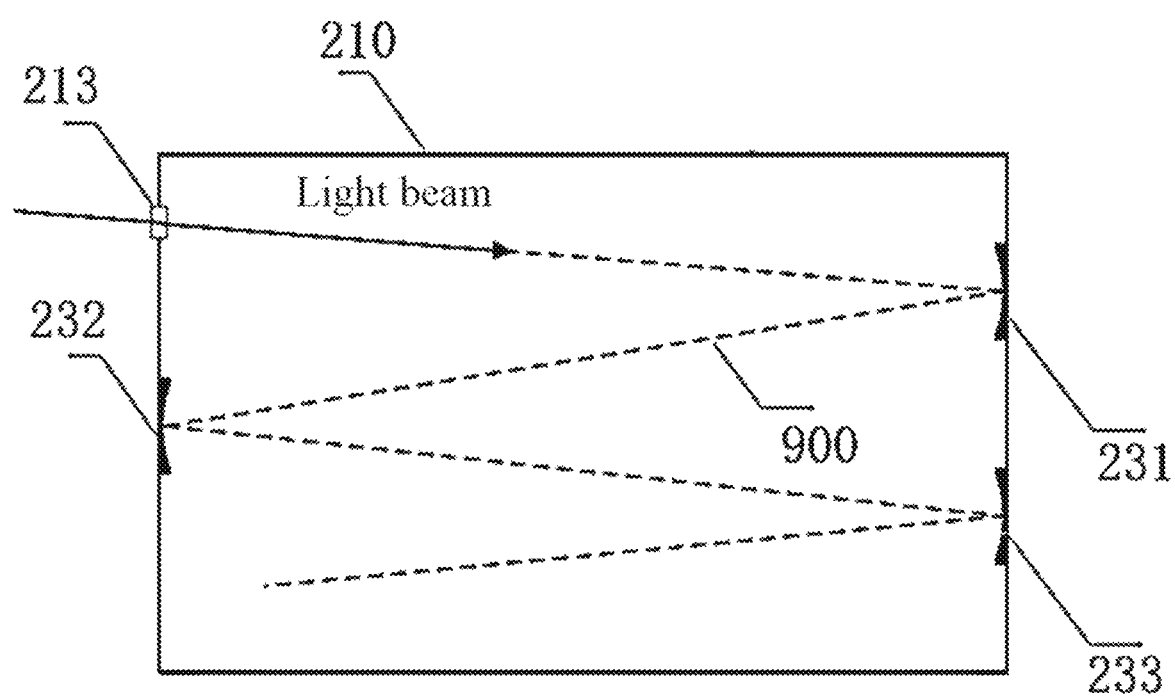
FIG. 6 is a schematic diagram of an interior of a cavity of an optical gas cell according to an embodiment of the present disclosure.

The cavity 210 of the optical gas cell 200 is provided with an inlet 211 and an outlet 212 for the gas samples (since FIG. 6 is a simple schematic diagram, the inlet 211 and the outlet 212 of the cavity shown therein are not drawn), as well as an incident window for the light beam; the inlet 211 and the outlet 212 of the gas sample are both arranged at the top of the cavity 210, and the inlet 211 is connected to a pipe with a valve 700; an incident lens 213 is installed at the incident window in a sealed manner; the light beam is injected into the cavity 210 by means of the incident lens 213, and is reflected by the reflection module group to form the light path 900.

A possible implementation of the reflection module group will be provided below. Referring to FIG. 6, in this possible implementation, the reflection module group consists of three reflectors that are configured to achieve multiple reflections of the incident beam and increase the optical path length. The three reflectors are respectively denoted as a first reflector 231, a second reflector 232, and a third reflector 233. The first reflector 231 is installed on a second side surface of the cavity 210 opposite to a first side surface where the incident lens 213 is located, the second reflector 232 is installed on the first side surface of the cavity 210 and is located below the incident lens 213, and the third reflector 233 is installed on the second side surface of the cavity 210 and is located below the first reflector 231. That is, the incident lens 213 and the second reflector 232 are both installed on the first side surface of the cavity 210, while the first reflector 231 and the third reflector 233 are installed on the second side surface of the cavity 210 opposite to the first side surface. When the incident beam is transmitted into the cavity 210 by means of the incident lens 213, it first reaches the first reflector 231, is then reflected onto the second reflector 232, and is reflected onto the third reflector 233 again.

Figure 7:
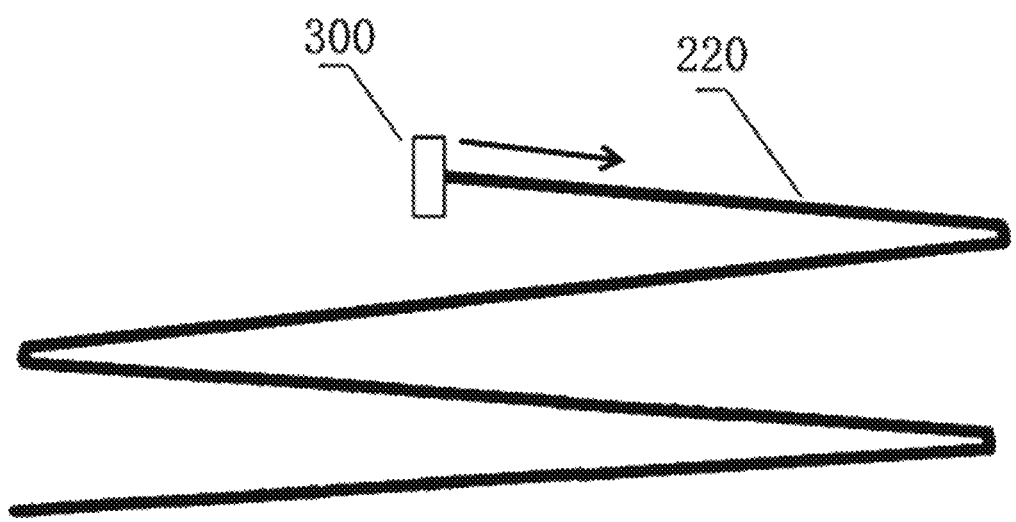
FIG. 7 is a schematic diagram of motion of a detector module along a track according to an embodiment of the present disclosure.

In the embodiments of the present disclosure, the detector module 300 is connected to the track 220 arranged in the cavity 210 in a relatively movable manner, and the detector module 300 can move along the track 220 under the action of an external force. Referring to FIG. 7 as a schematic diagram, the detector module moves along the track, the track 220 is consistent with the optical path 900 of the incident beam in the cavity 210, and when the detector module 300 moves along the truck 220, optical path adjustability is achieved by changing the optical path. The detector module 300 is moved so that the detector module 300 can be placed at different positions on the track 220 to receive optical signals and collect spectral data under different optical paths.

Figure 8:
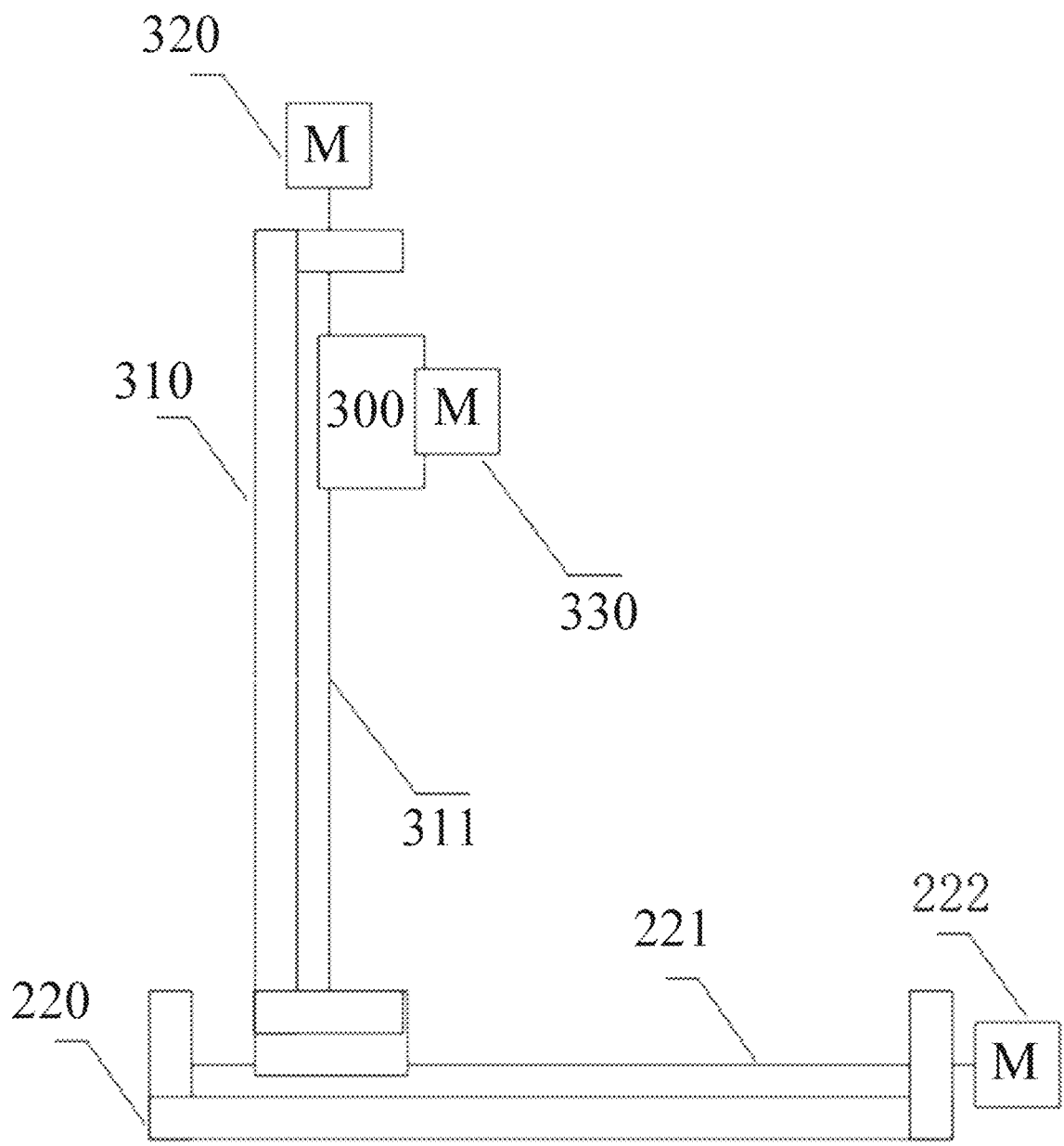
FIG. 8 is a schematic diagram of connection between the detector module and the track according to an embodiment of the present disclosure.

A possible manner of connection between the detector module and the track is provided below in conjunction with FIG. 8. A transmission mechanism 221 is installed on the track 220, the detector module 300 is connected to the transmission mechanism 221, the transmission mechanism 221 drives the detector module 300 to move under the driving action of the first driving motor 222, the transmission mechanism 221 is configured to convert rotary motion outputted by the first driving motor 222 into linear motion of the detector module 300, a ball screw can be chosen as the transmission mechanism 221, and the first driving motor 222 is preferably a servo motor.

When the detector module 300 moves along the track 220, it is necessary to always ensure that its light-receiving surface faces an incident direction of the light beam. Therefore, the embodiments of the present disclosure further provide a possible preferred solution: the detector module 300 is connected to the transmission mechanism 221 by means of a support frame 310, a vertical shaft 311 is arranged on the support frame 310, and the detector module 300 is slidably connected to the vertical shaft 311: by means of a second driving motor 320 arranged on the support frame 310, the detector module 300 is driven to move up and down along the vertical shaft 311; by means of a third driving motor 330 arranged on the support frame 310, the detector module 300 is driven to rotate; the detector module 300 is adjusted to move up and down and rotate to ensure that its light-receiving surface faces the incident direction of the light beam. The second driving motor 320 and the third driving motor 330 are preferably servo motors.

Ina possible specific implementation, a single movement distance of the detector module 300, that is, an optical path change step, is adjusted by adjusting parameters of the first driving motor 222. Each time when the detector module 300 moves, the spectrum data is recorded. When the single movement distance is set to be 0.1 mm, the optical path changes by 0.1 mm each time when the detector module 300 moves once. Of course, the single movement distance is not limited to 0.1 mm, but can be further adjusted to 1 mm, 1 cm, 10 cm, etc. as required.

To achieve portable detection, the detector module 300 in the embodiments of the present disclosure is a µFPF detector array. The µFPF detector array is composed of a plurality of µFPF detectors, and in one possible implementation, the FPF detector array consists of four µFPF detectors arranged in a 2×2 manner. Compared with a single µFPF detector, a µFPF detector array enables to obtain a larger spectral band range. The µFPF detector array used in this possible implementation is capable to achieve spectral detection in a wave number range of 900-3000 cm-1. In view that the optical path may be blocked when the µFPF detector array moves along the track 220, blocking of the optical path may be avoided by adjusting a receiving area size of the µFPF detector array, the number of reflectors, angles of the reflectors, etc.

The µFPF detectors are constructed based on F-P tunable filters, such as micro F-P tunable filters of InfraTec GmbH. The principle of the µFPF detector constructed based on the F-P tunable filter is as follows: an infrared detector is fixedly installed on a fixed substrate, a lower reflector is attached to an upper surface of the infrared detector, an upper reflector is located above the lower reflector and is controlled by a driving unit, and the driving unit is configured to drive the upper reflector to move up and down, so as to change a length of a resonant cavity and realize wavelength tuning. The µFPF detectors can be processed by use of MEMS technology, and are usually micron-sized. Furthermore, compared with traditional spectrometers, the µFPF detectors are cheaper and more suitable for popularization and application. In the embodiments of the present disclosure, the FPF detector is selected as the detector module.

The working principle of the device of complex gas mixture detection in the embodiments of the present disclosure is as follows:

The gas sample is filled into the optical gas cell 200, the incident beam, after being transmitted into the cavity 210 of the optical gas cell 200, is received by the detector module 300 connected to the track 220, and the detector module 300 records spectral data. The detector module 300 moves along the track 220, and when the optical path changes, the detector module 300 records spectral data again. The data acquisition unit 400 collects spectral data from the detector module 300, and because the position of the detector module 300 on the track 220 corresponds to the optical path length, spectral data under different optical paths can be obtained.

The spectral data obtained under different optical paths can be used to explore the intrinsic relationship between an optical path length of an optical gas cell and a spectrum of a complex gas mixture and provide data support for obtaining an optimal optical path length of the optical gas cell; and such data can be further used for qualitative and/or quantitative analysis of the complex gas mixture.

In order to further improve the accuracy of detecting complex gas mixtures, the embodiments of the present disclosure further provide a method of complex gas mixture detection based on optical-path-adjustable spectrum detection. The method specifically includes: with the change in an optical path length as a dimension, constructing a three-dimensional spectrogram of absorbance A, a wave number v and an optical path length L; then using a three-dimensional spectrum library to train a deep learning model; and using the trained deep learning model for the qualitative and/or quantitative detection of the gas samples.

Figure 5:
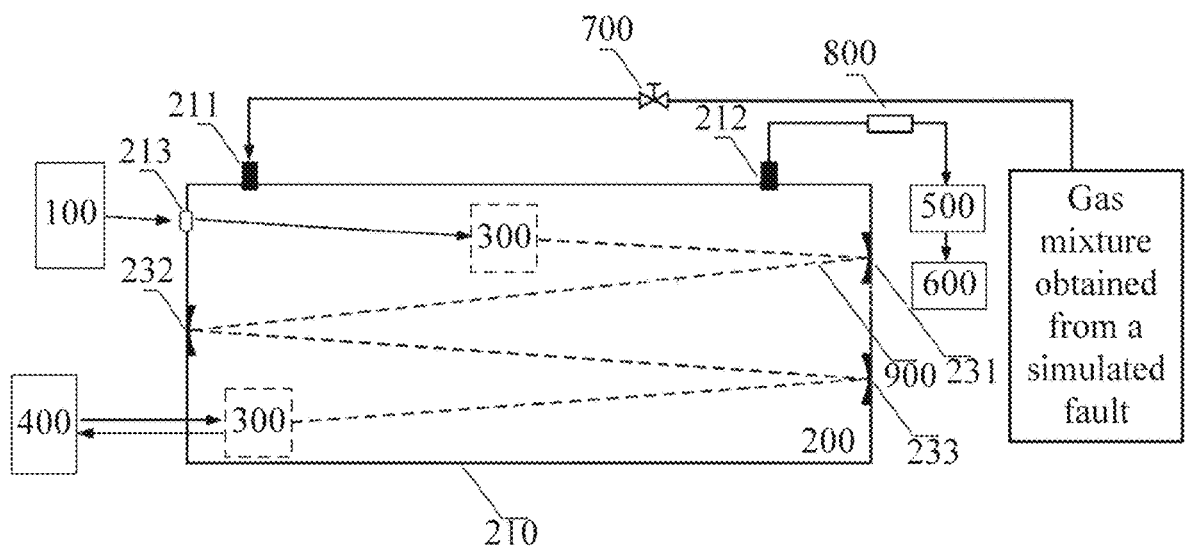
FIG. 5 is a schematic diagram of a structure of a device of complex gas mixture detection based on optical-path-adjustable spectrum detection according to an embodiment of the present disclosure.
Figure 9:
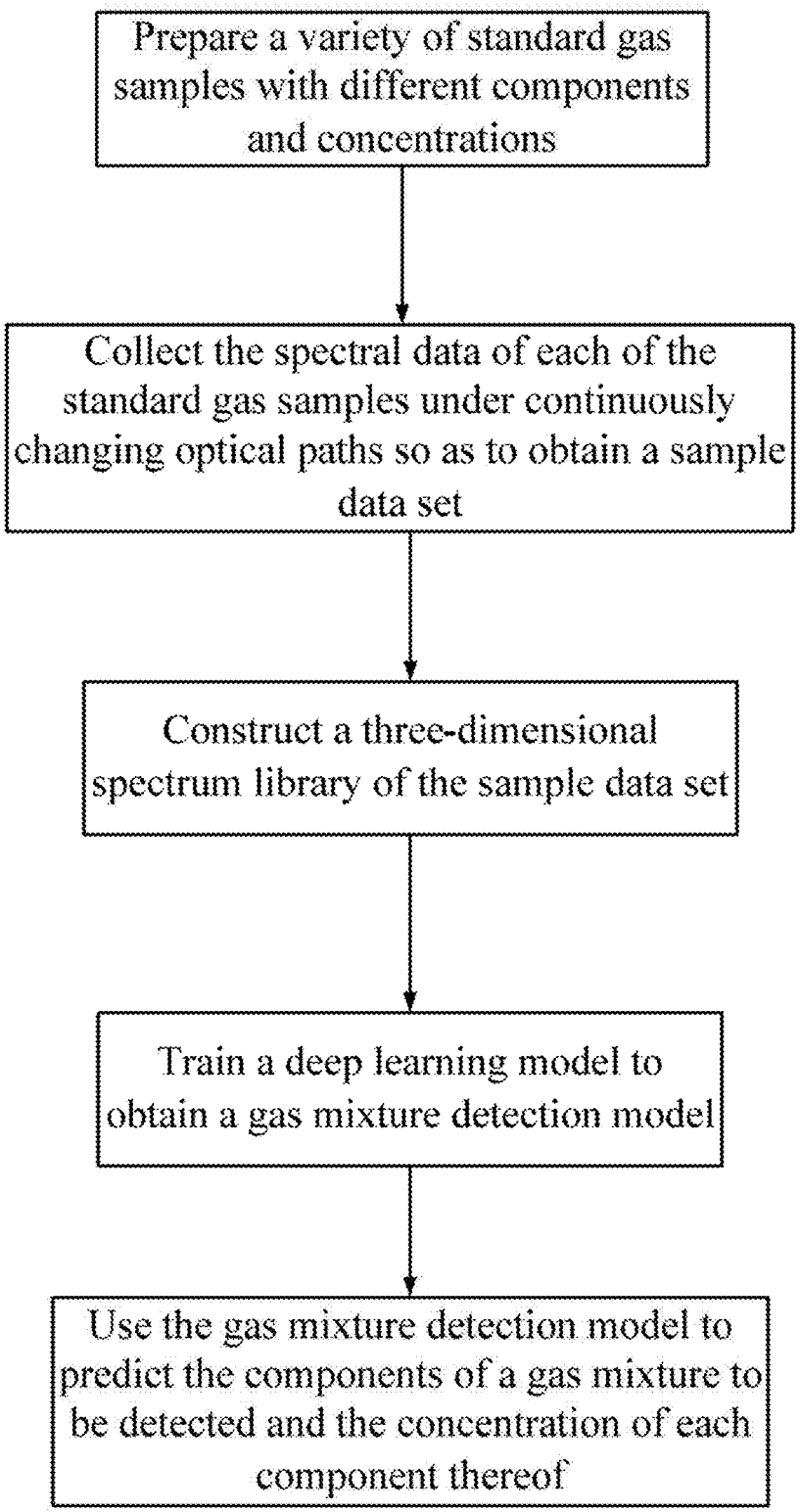
FIG. 9 is a flow diagram of a method of complex gas mixture detection based on optical-path-adjustable spectrum detection according to an embodiment of the present disclosure.

The specific implementation process of the method of complex gas mixture detection based on optical-path-adjustable spectrum detection will be provided below in conjunction with FIG. 9, and the steps are as follows:

S100: constructing a sample data set:
preparing a variety of standard gas samples with different components and concentrations, and using the above device of complex gas mixture detection to collect the spectral data of each of the standard gas samples under continuously changing optical paths so as to obtain a sample data set;

S200: analyzing the sample data set to obtain a three-dimensional spectrogram of the absorbance A, the wave number v and the optical path length L of each of the standard gas samples, so as to construct a three-dimensional spectrum library of the sample data set:
specifically, each optical path corresponds to spectral data, that is, a two-dimensional spectrogram of the absorbance A and the wave number v; as the detector module moves, the optical path length L changes continuously, so that a dimension of the optical path length L is extended on the basis of the two-dimensional spectrogram, and a three-dimensional spectrogram of the absorbance A, the wave number v and the optical path length L is formed;

S300: using the three-dimensional spectrum library to train a deep learning model so as to obtain a gas mixture detection model:
a convolutional neural network model may be adopted as the deep learning model, and related networks include an adversarial transfer convolutional neural network, a competitive adaptive reweighted convolutional neural network, and the like; specifically, taking the optical path length L, the absorbance A, and the wave number v corresponding to each three-dimensional spectrum in the three-dimensional spectrum library as features, and inputting the features and corresponding gas components and concentrations into the deep learning model; taking a corrected standard deviation, a predicted standard deviation, and a correlation coefficient as evaluation indicators, training and optimizing the deep learning model by optimizing network parameters such as an activation function, an optimizer, an initial learning rate of the optimizer, and a network structure, where the trained deep learning model is a gas mixture detection model;

optimizing the obtained gas mixture detection model, including:
changing an optical path range, an optical path step size, and the number of standard gas samples, and constructing gas mixture detection models corresponding to different optical path ranges, different optical path step sizes, and different numbers of standard gas samples; and then detecting the performance of the gas mixture detection models from the aspects of detection limits, detection errors, repeatability, etc. and obtaining the effects of the optical path range, the optical path step size, and the number of standard gas samples on the performance of the gas mixture detection models, so as to obtain the optimal optical path range, the optimal optical path step size, and the optimal number of samples; sampling according to the optimal optical path range, the optimal optical path step size, and the optimal number of samples; and S400: detecting complex gas mixtures:
using the above device of complex gas mixture detection to collect the spectral data of a gas mixture to be detected under continuously changing optical paths, and obtaining a three-dimensional spectrogram; and inputting the three-dimensional spectrogram of the gas mixture to be detected into the gas mixture detection model, to obtain the components of the gas mixture to be detected and the prediction results of the concentration of each component thereof;

further, when constructing the sample data set, obtaining simulated fault gas samples as standard gas samples according to the following method: simulating different faults of electrical equipment (such as discharge, overheating, etc.), where gas mixtures generated in case of different faults are the simulated fault gas samples; referring to FIG. 5, filling the simulated fault gas sample into the cavity 210 of the optical gas cell 200, and collecting the spectral data of the simulated fault gas sample under continuously changing optical paths; at the same time, sampling the simulated fault gas by means of a sampling pump 800, collecting the obtained simulated fault gas into a gas sampling bag 500, and then using a standard detection instrument 600 (such as a gas chromatograph-mass spectrometer (GC-MS)) for qualitative and quantitative detection of the simulated fault gas sample to obtain the components of the simulated fault gas sample and the concentration of each component thereof; collecting the spectral data of the simulated fault gas samples under continuously changing optical paths to obtain a data set of the simulated fault gas samples, constructing a three-dimensional spectrum library of the simulated fault gases based on the data set of the simulated fault gas samples, and using the three-dimensional spectra in the three-dimensional spectrum library of the simulated fault gases to train the deep learning model, where the trained deep learning model can be used to predict the components of a gas mixture produced in case of any fault and the concentration of each component thereof; Since decomposition products generated by the gas mixture of $C_4F_7N/CO_2$ are different in case of different faults, qualitative and/or quantitative detection of the simulated fault gas samples can be performed to determine the faults.

It should be noted that the above are only the preferred embodiments of the present disclosure and the technical principles applied. Those skilled in the art should understand that the present disclosure is not limited to the particular embodiments described herein, and various obvious changes, readjustments and substitutions may be made by those skilled in the art without departing from the scope of protection of the present disclosure. Thus, although the present disclosure has been described in greater detail by way of the above embodiments, the present disclosure is not limited to the above embodiments and may include many other equivalent embodiments without departing from the concept of the present disclosure, which all fall within the scope of protection of the present disclosure.

What is claimed is:

1. A device of complex gas mixture detection based on optical-path-adjustable spectrum detection, comprising:
    a light source that is configured for generating an incident beam and emitting the incident beam into an optical gas cell:
    the optical gas cell, comprising a cavity, and a reflection module group and a track arranged in the cavity, wherein the cavity is configured for accommodating a gas sample, the reflection module group comprises one or more reflection modules and is configured for reflecting the incident beam inside the cavity once or multiple times, and the track is consistent with a light path of the light beam in the cavity;
    a detector module that is connected with the track in a relatively movable manner and is configured for receiving light beams and obtaining spectral data; and
    a data acquisition unit that is configured for acquiring the spectral data obtained by the detector module and performing qualitative and/or quantitative analysis of a gas sample to be detected, wherein the steps specifically comprise: with the change in an optical path length as a dimension, constructing a three-dimensional spectrogram of absorbance, a wave number and an optical path length; then using a three-dimensional spectrum library to train a deep learning model;
    and using the trained deep learning model for the qualitative and/or quantitative detection of the gas samples.

2. The device of complex gas mixture detection based on optical-path-adjustable spectrum detection according to claim 1, further comprising: a first driving motor and a transmission mechanism on the track, wherein the detector module is connected to the transmission mechanism, an output shaft of the first driving motor is connected to the transmission mechanism, and the transmission mechanism is configured to convert rotary motion outputted by the first driving motor into linear motion of the detector module, so as to drive the detector module to move along the track.

3. The device of complex gas mixture detection based on optical-path-adjustable spectrum detection according to claim 2, wherein a ball screw can be chosen as the transmission mechanism.

4. The device of complex gas mixture detection based on optical-path-adjustable spectrum detection according to claim 2, further comprising a second driving motor and a third driving motor, wherein the detector module is connected to the transmission mechanism by means of a support frame, a vertical shaft is arranged on the support frame, and the detector module is slidably connected to the vertical shaft; the second driving motor is arranged on the support frame and configured to drive the detector module to move up and down along the vertical shaft; and the third driving motor is arranged on the support frame and configured to drive the detector module to rotate.

5. The device of complex gas mixture detection based on optical-path-adjustable spectrum detection according to claim 1, wherein the detector module employs a μFPF detector array.

6. A method of complex gas mixture detection based on optical-path-adjustable spectrum detection, comprising the following steps:
    S100: preparing a variety of standard gas samples with different components and concentrations, and using the device of complex gas mixture detection according to claim 1 to collect the spectral data of each of the standard gas samples under continuously changing optical paths so as to obtain a sample data set;
    S200: analyzing the sample data set to obtain a three-dimensional spectrogram of absorbance, a wave number and an optical path length of each of the standard gas samples, so as to construct a three-dimensional spectrum library of the sample data set:
    S300: using the three-dimensional spectrum library to train a deep learning model so as to obtain a gas mixture detection model; and
    S400: using the device of complex gas mixture detection according to claim 1 to collect the spectral data of a gas sample to be detected under continuously changing optical paths, and constructing a three-dimensional spectrogram of the gas sample to be detected; and inputting the three-dimensional spectrogram into the gas mixture detection model, i.e., performing qualitative and/or quantitative detection of the gas sample to be detected.

7. The method of complex gas mixture detection based on optical-path-adjustable spectrum detection according to claim 6, wherein a convolutional neural network model may be adopted as the deep learning model.

8. The method of complex gas mixture detection based on optical-path-adjustable spectrum detection according to claim 6, wherein
    using the device of complex gas mixture detection according to claim 1 to collect the spectral data of each of the standard gas samples under continuously changing optical paths, specifically comprising:
    the optical gas cell contains the standard gas samples, so that the detector module moves relative to the track according to a preset optical path step size; in a process of moving each time, spectral data is collected, thereby obtaining the spectral data of the standard gas samples under continuously changing optical path lengths.

9. The method of complex gas mixture detection based on optical-path-adjustable spectrum detection according to claim 6, wherein
    using the device of complex gas mixture detection according to claim 1 to collect the spectral data of a gas sample to be detected under continuously changing optical paths, specifically comprising:
    the optical gas cell contains the gas sample to be detected, so that the detector module moves relative to the track according to a preset optical path step size; in a process of moving each time, spectral data is collected, thereby obtaining the spectral data of the gas sample to be detected under continuously changing optical path lengths.

10. The method of complex gas mixture detection based on optical-path-adjustable spectrum detection according to claim 6, wherein the standard gas samples comprise a plurality of prepared standard gas samples and/or simulated fault gas samples with different components and concentrations; the simulated fault gas samples are gas mixtures generated by simulating different faults of electrical equipment; and a standard detection instrument is used for qualitative and quantitative detection of a simulated fault gas sample to obtain the components of the simulated fault gas sample and the concentrations of each component thereof.

* * * * *